US012743494B2

(12) United States Patent
Brickman et al.

(10) Patent No.: US 12,743,494 B2
(45) Date of Patent: Sep. 22, 2026

(54) DETERMINATION OF COMPUTING IDENTITIES AND USES THEREOF

(71) Applicant: Oasis Security Ltd., Tel Aviv (IL)

(72) Inventors: Michael Brickman, Tel Aviv (IL); Yonit Glozshtein, Tel Aviv (IL)

(73) Assignee: Ocean Security Ltd., Tel Aviv (IL)

( * ) Notice: Subject to any disclaimer, the term of this patent is extended or adjusted under 35 U.S.C. 154(b) by 195 days.

(21) Appl. No.: 18/646,088

(22) Filed: Apr. 25, 2024

(65) Prior Publication Data

US 2025/0335557 A1 Oct. 30, 2025

(51) Int. Cl.
*G06F 21/31* (2013.01)
*H04L 9/40* (2022.01)

(52) U.S. Cl.
CPC .......... *G06F 21/31* (2013.01); *H04L 63/1416* (2013.01)

(58) Field of Classification Search
None
See application file for complete search history.

(56) References Cited

U.S. PATENT DOCUMENTS 8,316,237 B1 11/2012 Felsher et al.
9,614,880 B1 * 4/2017 Davis .................. H04L 65/4061
10,127,378 B2 11/2018 Toth
11,695,755 B2 7/2023 Caldera et al.
11,750,609 B2 9/2023 Gilpin et al.
11,810,080 B2 11/2023 Lin et al.
11,868,966 B2 * 1/2024 Vanasco ............... G06Q 10/107
2016/0021245 A1 1/2016 Chmaytelli
2025/0030712 A1 * 1/2025 Saraf ................... H04L 63/1425
2025/0133120 A1 * 4/2025 Valek .................. H04L 63/1433
2025/0211551 A1 * 6/2025 Danino .................. H04L 51/02

FOREIGN PATENT DOCUMENTS

WO WO-2022123556 A1 * 6/2022 ........... G06F 3/0481
WO WO-2024145209 A1 * 7/2024 ............. G06N 3/045
WO WO-2025072523 A1 * 4/2025 ........... H04L 63/102

* cited by examiner

*Primary Examiner* — James R Turchen
(74) *Attorney, Agent, or Firm* — M&B IP Analysts, LLC

(57) ABSTRACT

A system and method for determining identity ownership. A method includes identifying a plurality of interactions performed with respect to a plurality of computing identities, wherein each interaction is performed by a respective entity of a plurality of entities and with respect to a respective computing identity of the plurality of computing identities; aggregating the plurality of interactions in order to create at least one set of aggregated interactions, wherein each set of aggregated interactions includes a subset of the plurality of interactions performed with respect to one of the plurality of computing identities, wherein the plurality of interactions includes a plurality of modifications of data used to manage access activities of the plurality of computing identities; and determining an owner of each computing identity based on the at least one set of aggregated interactions, wherein the owner of each computing identity is one of the plurality of entities.

15 Claims, 6 Drawing Sheets

DETERMINATION OF COMPUTING IDENTITIES AND USES THEREOF

TECHNICAL FIELD

The present disclosure relates generally to computing identities, and more specifically to determining owners of computing identities.

BACKGROUND

Identity computing refers to the management and control of digital identities and their associated privileges. A digital identity may be, or may include, a collection of unique identifiers which are utilized to determine users and what those users are allowed to access and do. Having ownership of a digital identity or otherwise being allowed to use a digital identity may allow a computing system to initiate certain actions, to access certain data, or otherwise to perform activities requiring identity-based permissions.

In modern computing environments, identity usage has become more fluid. Identities may change more frequently, may be reassigned to different users over time, may be assigned to machine users (e.g., systems or applications) rather than just to human users, and so on. As a result, tracking ownership of computing identities has become more challenging.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for determining identity ownership. The method comprises: identifying a plurality of interactions performed with respect to a plurality of computing identities, wherein each interaction is performed by a respective entity of a plurality of entities and with respect to a respective computing identity of the plurality of computing identities; aggregating the plurality of interactions in order to create at least one set of aggregated interactions, wherein each set of aggregated interactions includes a subset of the plurality of interactions performed with respect to one of the plurality of computing identities, wherein the plurality of interactions includes a plurality of modifications of data used to manage access activities of the plurality of computing identities; and determining an owner of each computing identity based on the at least one set of aggregated interactions, wherein the owner of each computing identity is one of the plurality of entities.

Certain embodiments disclosed herein also include a non-transitory computer readable medium having stored thereon causing a processing circuitry to execute a process, the process comprising: identifying a plurality of interactions performed with respect to a plurality of computing identities, wherein each interaction is performed by a respective entity of a plurality of entities and with respect to a respective computing identity of the plurality of computing identities; aggregating the plurality of interactions in order to create at least one set of aggregated interactions, wherein each set of aggregated interactions includes a subset of the plurality of interactions performed with respect to one of the plurality of computing identities, wherein the plurality of interactions includes a plurality of modifications of data used to manage access activities of the plurality of computing identities; and determining an owner of each computing identity based on the at least one set of aggregated interactions, wherein the owner of each computing identity is one of the plurality of entities.

Certain embodiments disclosed herein also include a system for determining identity ownership. The system comprises: a processing circuitry; and a memory, the memory containing instructions that, when executed by the processing circuitry, configure the system to: identify a plurality of interactions performed with respect to a plurality of computing identities, wherein each interaction is performed by a respective entity of a plurality of entities and with respect to a respective computing identity of the plurality of computing identities; aggregate the plurality of interactions in order to create at least one set of aggregated interactions, wherein each set of aggregated interactions includes a subset of the plurality of interactions performed with respect to one of the plurality of computing identities, wherein the plurality of interactions includes a plurality of modifications of data used to manage access activities of the plurality of computing identities; and determine an owner of each computing identity based on the at least one set of aggregated interactions, wherein the owner of each computing identity is one of the plurality of entities.

Certain embodiments disclosed herein include the method, non-transitory computer readable medium, or system noted above, further including or being configured to perform the following step or steps: analyzing a plurality of uses of permissions with respect to the computing identity; and determining a plurality of identity management actions among the plurality of interactions based on based on the plurality of uses of permissions with respect to the computing identity, wherein each of the plurality of identity management actions includes one of the plurality of modifications of data, wherein the owner of the computing identity is determined based further on the plurality of identity management actions.

Certain embodiments disclosed herein include the method, non-transitory computer readable medium, or system noted above, wherein the plurality of identity management actions include at least one of: changing a password, assigning a role, and assigning permissions.

Certain embodiments disclosed herein include the method, non-transitory computer readable medium, or system noted above, further including or being configured to perform the following step or steps: generating a plurality of ownership scores for the computing identity, wherein the owner of the computing identity is determined based further on the plurality of ownership scores.

Certain embodiments disclosed herein include the method, non-transitory computer readable medium, or system noted above, wherein the plurality of ownership scores is determined based on at least one: a type of each interaction, a recency of each interaction, an amount of interactions, and an explicit indication of ownership for the computing identity.

Certain embodiments disclosed herein include the method, non-transitory computer readable medium, or system noted above, wherein the computing identity is a first computing identity, further including or being configured to perform the following step or steps: analyzing at least one historical ownership result for a second computing identity, wherein the owner of the first computing identity is determined based on an owner of the second computing identity among the at least one historical ownership result, wherein the owner of the first computing identity is determined based further on a service or resource accessed using the first computing identity and a service or resource accessed using the second computing identity.

Certain embodiments disclosed herein include the method, non-transitory computer readable medium, or system noted above, further including or being configured to perform the following step or steps: assigning at least one remediation task to the determined owner, wherein the at least one remediation task is to remediate a cybersecurity event involving the computing identity.

Certain embodiments disclosed herein include the method, non-transitory computer readable medium, or system noted above, further including or being configured to perform the following step or steps: generating a secret for the computing identity; and sending a notification indicating the generated secret to the determined owner.

Certain embodiments disclosed herein include the method, non-transitory computer readable medium, or system noted above, wherein the generated secret is a new secret, further including or being configured to perform the following step or steps: verifying cessation of use of an old secret by the computing identity; verifying use of the new secret by the computing identity; and disabling the old secret when the cessation of use of the old secret and the use of the new secret have been verified.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
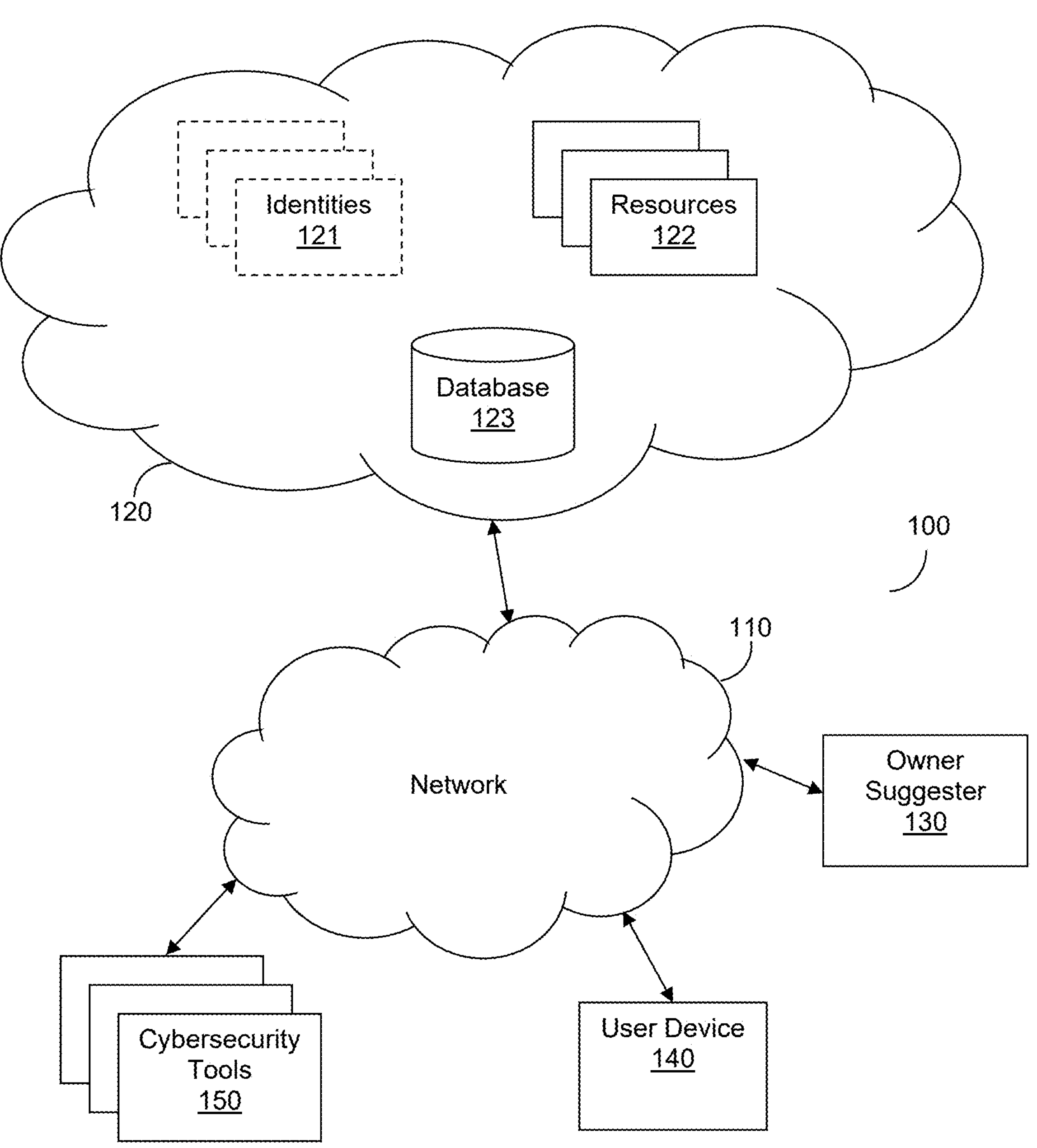
FIG. 1 is a network diagram utilized to describe various disclosed embodiments.

The various disclosed embodiments include a method and system for ownership determination and for providing ownership suggestions for purposes such as, but not limited to, assigning cybersecurity tasks and aiding in secrets rotation. In an embodiment, interactions data indicating information about interactions with identities is obtained and utilized in order to determine potential owners of digital identities (also referred to as identities). Specifically, the disclosed embodiments include various techniques which allow for determining ownership of computing environments which may be utilized for purposes such as, but not limited to, management of a computing environment, and in particular for securing the computing environment against potential cyber threats.

In an embodiment, the interactions data at least indicates identity management actions performed with respect to computing identities (also referred to herein as "identities") acting within a computing environment, which in turn can be utilized to determine potential owners of a given identity. Non-limiting examples for such identity management actions may include, but are not limited to, changing a password of an identity, updating data used for determining the identity (e.g., a name, a description, or other details about the identity), assigning a new role to the identity, revoking a role for the identity, assigning or revoking permissions of the identity, combinations thereof, and the like. Such interactions data may include or be based on audit data, log data, or other data indicating certain activities performed on or using identities in a computing environment.

The ownership determination may include aggregating interactions and identifying instances of identity management actions. In some embodiments, ownership scores may be generated and utilized in order to determine suggested owners among potential owners represented in the interactions data. The ownership scores may be weighted scores determined using weighted values for respective factors such as, but not limited to, type of action (e.g., changing a password may have a higher value than certain other types of actions), recency or otherwise timing (e.g., more recent would have a higher value), amount or frequency of interactions for a given identity (e.g., more frequent would have a higher value), explicit indicators of ownership (e.g., an explicit indication that an identity belongs to a given owner would have a high value toward determining that identity as belonging to that owner), similar resources (e.g., identities of owners of similar resources would have higher values than identities which are not owners of similar resources), a combination thereof, and the like.

Once a suggested owner has been determined, the suggested owner may be utilized for one or more purposes such as suggesting recipients for newly generated secrets which will replace old secrets, suggesting identities of users to be assigned cybersecurity tasks with respect to certain resources, suggesting recipients for messages sent to confirm modification or deletion of an account with respect to a given resource, and the like. As a non-limiting example, the suggested owners may be utilized as part of an automated secrets rotation process in order to identify users which might be affected by the secrets rotation (e.g., users which are owners of old secrets which will be rotated out and replaced with new secrets), and the new secrets generated as part of the secrets rotation process may be sent to the identified users for implementation. As another example, an owner of a resource may be suggested when a policy violation is detected with respect to the resource, and the mitigation of the policy violation may be assigned to the suggested owner since that owner is more likely to be able and willing to perform remediation actions with respect to that resource.

FIG. 1 shows an example network diagram 100 utilized to describe the various disclosed embodiments. In the example network diagram 100, a computing environment 120, an ownership manager 130, a user device 140, and one or more cybersecurity tools 150 communicate via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

The computing environment 120 includes various identities 121 whose ownership may be identified and utilized in accordance with various disclosed embodiments. Each of the identities 121 is a computing identity. Such a computing identity is a digital identity having one or more associated access authorizations such as, but not limited to, authorization to access certain actions or resources. More specifically, in some implementations, at least some of these access authorizations may include authorization to access or otherwise perform actions with respect to one or more of the resources 122.

The identities 121 may be assigned to resources among the resources 122, to users of such resources, or otherwise to users who are to be given authorization to perform certain access activities within the computing environment 120. Consequently, the identities 121 allow for managing such access activities, i.e., identities may be assigned to selectively allow access to actions, resources, both, and the like. It should be noted that, in at least some implementations, only some of the resources 122 may be assigned identities among the identities 121. Additionally, multiple identities among the identities 121 may be assigned to a given resource among the resources 122 and vice versa (i.e., a given identity may be assigned to multiple resources). When an identity is assigned to a resource or user, that resource or user is provided authorization to perform access activities associated with the identity.

The resources 122 may include systems, data stores, services, applications, and other computing components which may be accessed or otherwise acted upon by systems and applications (not shown) deployed in or acting with respect to the computing environment 120. In some implementations, at least some of the resources 122 may each be assigned one or more identities among the identities 121 in order to allow those resources to access other resources among the resources 122 or otherwise to perform certain actions within or with respect to the computing environment 120.

Data related to, used by, or otherwise used as part of identity management for the identities 121 may be stored in the database 123. Such data may include, but is not limited to, data indicating assignments of identities (e.g., which resources or users each identity is assigned to, timestamps for such assignments, conditions for deactivating assignments, etc.), credentials used by identities for authentication to certain services (e.g., username, password, both, etc.), combinations thereof, portions thereof, and the like.

The data stored in the database 123 may further include interactions data related to interactions with or using the identities 121. Such interactions data may include log data, audit data, or other data representing aspects of interactions involving the identities 121. In particular, the interactions data may include, but is not limited to, identity management actions performed with respect to computing identities (also referred to herein as "identities") acting within a computing environment, which in turn can be utilized to determine potential owner of a given identity. Non-limiting examples for such identity management actions may include, but are not limited to, changing a password of an identity, updating data used for identifying the identity (e.g., a name, a description, or other details about the identity), assigning a new role to the identity, revoking a role for the identity, assigning or revoking permissions of the identity, combinations thereof, and the like.

The user device (UD) 140 may be, but is not limited to, a personal computer, a laptop, a tablet computer, a smartphone, a wearable computing device, or any other device capable accessing resources among the resources 122 or otherwise performing actions via computing components of the computing environment 120. In at least some implementations, the user device 140, a logical component of the user device 140 (e.g., an application or other program, not shown), an operator of the user device 140, or a combination thereof, may be assigned identities among the identities 121 in order to facilitate access activities with respect to the computing environment 120.

The cybersecurity tools 150 may be configured to, among other things, detect violations of policies which may be indicative of cyber threats. In accordance with various disclosed embodiments, such violations may be remediated in order to protect the computing environment 120 against potential cyber threats. Moreover, as discussed herein, determining an appropriate owner of an identity may allow for better remediation by allowing for identifying a user or system which has a higher likelihood of being willing to remediate the cyber threat, of being able to remediate the cyber threat, or both. That is, by accurately determining an owner of an identity which accessed a specific resource in an event which constituted a cybersecurity violation, that owner may be suggested as an owner to which the violation should be sent (e.g., via a notification) or otherwise assigned. This allows for improving cybersecurity in the computing environment 120 by increasing the likelihood that cyber threats are successfully remediated and by increasing the average response time for remediating cyber threats.

Figure 2:
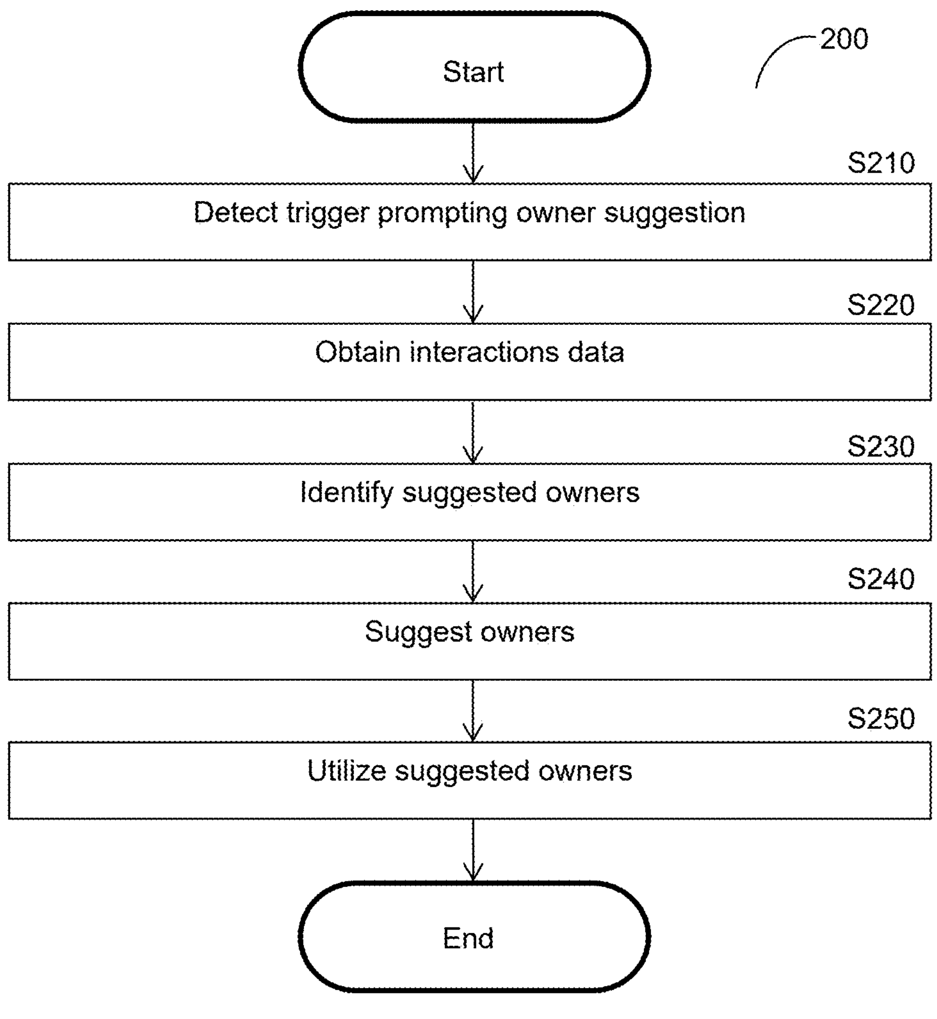
FIG. 2 is a flowchart illustrating a method for ownership suggestion according to an embodiment.

FIG. 2 is a flowchart 200 illustrating a method for ownership suggestion according to an embodiment. In an embodiment, the method is performed by the ownership manager 130, FIG. 1.

At S210, a trigger for ownership determination is detected. The trigger may be, but is not limited to, a situation where ownership determination may be needed or otherwise may be useful. As non-limiting examples, such a trigger may be, may include, or may otherwise be detected based on an explicit request for ownership determination (e.g., a request sent to the ownership manager 130 requesting a suggested owner for a particular identity), an indication of an identity whose usage triggered a cybersecurity event (e.g., an identity indicated in a policy violation reported by one of the cybersecurity tools 150), and the like.

In an embodiment, the trigger is detected with respect to a particular identity whose ownership is to be suggested. As noted above, incoming data such as a request or cybersecurity event may indicate which identity was used to perform an access activity or otherwise an identity whose ownership may be desired. In a further embodiment, the identity is a computing identity, which is a digital identity having one or more associated access authorizations such as, but not limited to, authorization to access certain actions or resources. More specifically, in some implementations, at least some of these access authorizations may include authorization to access or otherwise perform actions with respect to one or more of the resources.

In another embodiment, the ownership determination trigger may be an initiation of one or more activities related to managing identity ownership. Such activities may include, but are not limited to, an attempt to add an owner, changing an account for an identity which may affect an owner's ability to access certain resources or actions, both, and the like.

When an administrator or other user attempts to add an owner for an identity, ownership may be determined as discussed herein and suggested (e.g., via a notification) to that user, for example, by providing a list of potential owners including the suggested owners. This may help facilitate selecting an appropriate owner by such user. Such a list may include, but are not limited to, users who are not known to the system performing ownership determination, users who are known and logged in to the system performing ownership determination, other users (e.g., users who are known but not logged in to the system performing ownership determination), and the like.

Additionally, when an administrator plans to change or delete an account for an identity, the initiation of such a change or deletion may prompt suggesting an owner. The suggested owner may be provided to the administrator (e.g., via a notification) or the suggested owner may be notified of the impending change or deletion in order to allow the owner to provide feedback about whether the owner still uses the account which may be utilized to make decisions such as, for example, assigning a new account or avoiding making the planned changes.

At S220, interactions data related to one or more interactions with or using the identity is obtained. The interactions data includes data related to the identity, and in particular may include data related to interactions which modify roles, assignments, permissions, or other data used to control access activities using the identity. Such data related to interactions which affect access activities using the identity are more likely to be performed by an owner of the identity such that this interactions data may allow for accurately determining appropriate owners for a given identity.

In an embodiment, the interactions data includes identity management actions performed with respect to the identity. Each identity management action modifies data used for managing access by the identity such as, but not limited to, data indicating permissions, roles, or identifying information of the identity. Accordingly, performing an identity management action with respect to a given entity affects which access activities can be performed using the identity (e.g., which actions, resources, or both, can be accessed by the identity, defined individually or defined via assignment of a role which has a predetermined combination of access activity authorizations) or affects how the identity is used to perform such access activities. In other words, the identity management action at least modifies the identity with respect to access activities.

Non-limiting examples for such identity management actions may include, but are not limited to, changing a password of an identity, updating data used for identifying the identity (e.g., a name, a description, or other details about the identity), assigning a new role to the identity, revoking a role for the identity, assigning or revoking permissions of the identity, combinations thereof, and the like.

At S230, one or more potential owners for the identity are determined. In an embodiment, the owners for the identity are determined based on one or more actions performed on or otherwise with respect to the identity. In a further embodiment, such actions include identity management actions which at least modifies the identity with respect to one or more access activities.

An example process for ownership determination which may be used at S230 is described further below with respect to FIG. 3.

At S240, the identified owners are suggested. Suggesting the owners may include, but is not limited to, generating a notification indicating which owners are suggested for the identity, assigning the owner to the identity in one or more databases, both, and the like.

At optional S250, the suggested owners are utilized. In an embodiment, the suggested owners are utilized for cybersecurity purposes such as, but not limited to, remediating policy violations or other potential cyber threats, updating secrets to proactively avoid cyber threats, both, and the like.

In an embodiment, utilizing the suggested owners to remediate a potential cyber threat includes assigning one or more of the suggested owners to the potential cyber threats. As a non-limiting example, remediating a policy violation involving a given identity may include assigning, to the policy violation, a particular user determined to be an owner of the identity. An example process for utilizing suggested owners to remediate cyber threats is discussed further below with respect to FIG. 4.

In another embodiment, utilizing the suggested owners to update secrets includes sending a new secret to the suggested owners. As a non-limiting example, a new password to be used for one or more access activities by a given identity is sent to 5 users who were determined to be owners of that identity. Accordingly, such utilization of suggested owners may allow for performing secrets rotation in which new passwords are generated and sent to the suggested owners, thereby prompting the suggested owners to begin implementing the new secret and update any applicable secrets data accordingly. In some embodiments, the new secret may be sent to each such owner in order to prompt each of the suggested owners to begin implementing the secret and updating their respective secrets data. An example process for utilizing suggested owners to update secrets is discussed further below with respect to FIG. 5.

Figure 3:
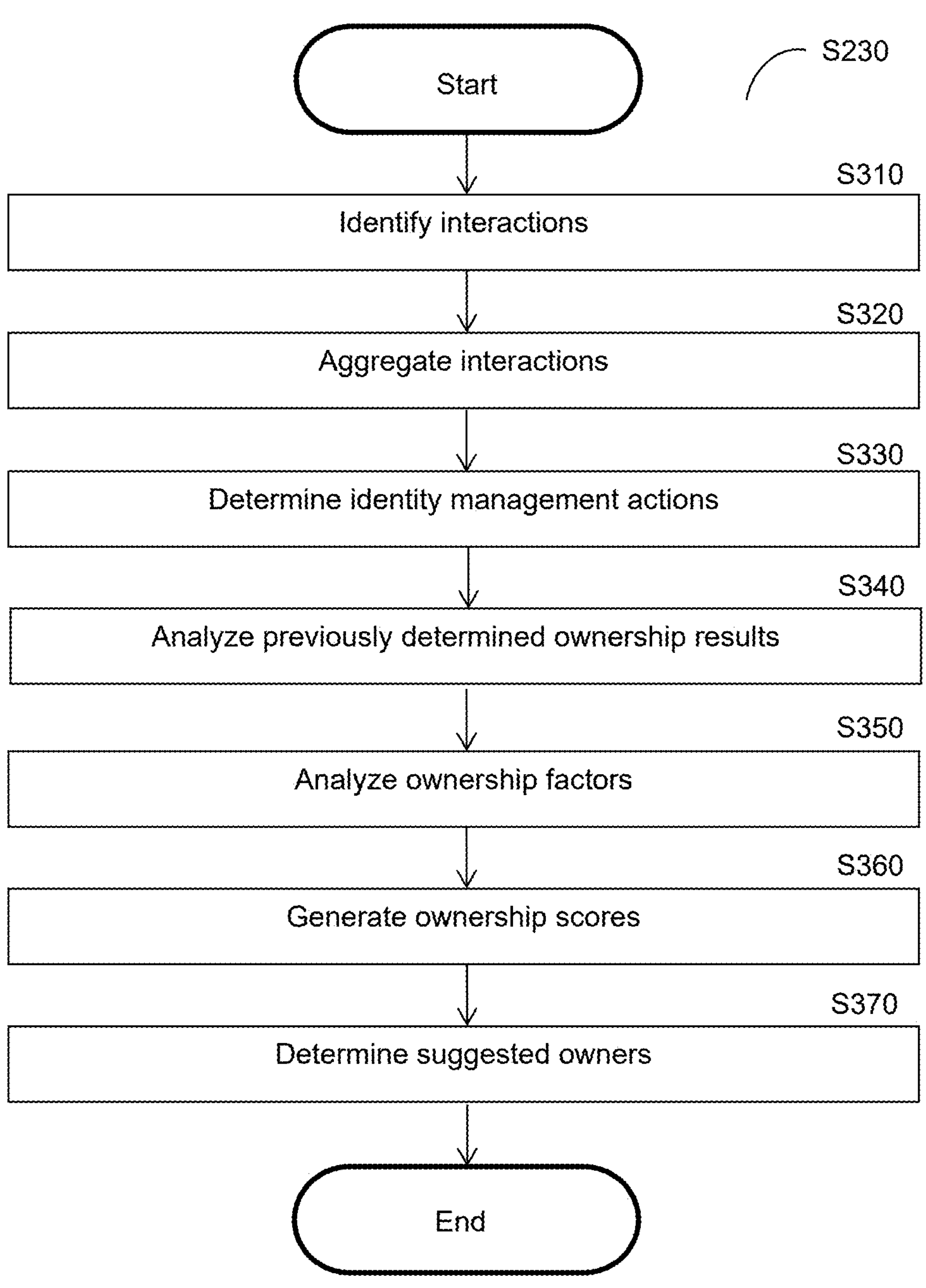
FIG. 3 is a flowchart illustrating a method for ownership determination according to an embodiment.

FIG. 3 is a flowchart S230 illustrating a method for ownership determination according to an embodiment.

At S310, interactions with or using identities are identified. As noted above, the interactions may be or may include identity management actions which modify data used to control access activities by the identities. In an embodiment, users, other identities, or other entities which interacted with each identity are also determined. The entities which interacted which a given identity may be owners of that identity and, thus, may be utilized to determine suggested or other potential owners as described herein.

At S320, the interactions are aggregated with respect to identities. More specifically, interactions related to the same entity are aggregated to create sets of aggregated interactions. Such aggregation allows for identifying which entities acted upon the same identity, identifying how many times each entity acted upon a given identity, checking for potential explicit indicators of ownership, combinations thereof, and the like.

At S330, identity management actions among the interactions are determined. In an embodiment, determining the identity management activities includes applying predetermined identity management activity determination rules. Such rules may define known types of actions which may be represented in interactions data that involve modifying data used for controlling access activities. As noted above, such identity management actions tend to indicate that the entity performing the action on a given identity is an owner of the identity such that the identity management actions may be utilized to determine potential owners for each identity.

Each identity management action includes modification of data used for managing access by the identity such as, but not limited to, data indicating permissions, roles, or identifying information of the identity. Accordingly, performing an identity management action with respect to a given entity affects which access activities can be performed using the identity (e.g., which actions, resources, or both, can be accessed by the identity, defined individually or defined via assignment of a role which has a predetermined combination of access activity authorizations) or affects how the identity is used to perform such access activities. In other words, the identity management action at least modifies the identity with respect to access activities.

In an embodiment, determining the identity management actions further includes analyzing use of permissions known to be utilized for identity management. To this end, such an analysis may include applying one or more predetermined identity management permissions usage rules that define predetermined types of permissions, specific permissions, or both, which are known to be associated with identity management actions or otherwise known to be exercised when performing identity management actions. Such permissions use may be indicated in log or audit data related to permissions usage, which may also indicate which entities exercised different permissions. As a non-limiting example, by identifying use of a type of permission known to change a password for an identity, the entity which exercised that permission on the identity may be identified as a potential owner of the identity.

At optional S340, previously determined (also referred to as historical) ownership results may be analyzed based on the interactions data. In an embodiment, a previously determined owner of an account used to perform identity management actions for an identity used to access a particular service or resource may be determined as the owner for an identity used to access a similar service or resource.

To this end, analyzing ownership of similar service accounts or resources may further include determining whether two services or resources are similar using one or more similarity rules. The similarity rules may define criteria for identifying similar services or resources which may include, but are not limited to, being the same type of service or resource, belonging to the same predetermined group of related services or resources, being deployed in the same portion of a computing environment, being the same service or resource (i.e., the identities were used to access a common service or resource), combinations thereof, and the like. If two services or resources are determined to be similar using such similarity rules, a previously determined owner of an identity used to access one of the services or resources may be determined as the owner of another identity used to access the other service or resource.

In a further embodiment, analyzing ownership of similar service accounts or resources may further include determining, for each pair of similar services or resources, whether one of the services or resources is in use and the other is not in use. In yet a further embodiment, when a first service or resource is in use and a similar second service or resource is not in use, a previously determined owner of an identity used to access the first service or resource is applied to the second service or resource. In this regard, it is noted that an owner of a service or resource that is in use may be more likely to also own any similar services or resources which are not being used.

In some embodiments, the full ownership analysis may not be performed for identities whose ownership is determined based on ownership of similar service accounts or resources. That is, analysis of ownership factors and ownership scores may be skipped for identities whose ownership is determined this way. By applying previously determined ownership results to identities used for accessing similar services or resources, computing resources may be conserved. More specifically, previous ownership determinations may be applied by determining similarity and without fully analyzing the ownership factors as discussed below, thereby reducing the amount of computing resources needed to perform the more involved analysis.

At S350, a set of ownership factors is analyzed for each identity with respect to the interactions data. Each ownership factor affects a likelihood that an entity which interacted with an identity in a given interaction is an owner of that identity and may therefore be utilized to determine ownership scores by assigning values representing respective likelihoods as discussed below. To this end, analyzing the ownership factors may include, but is not limited to, determining a type, number, check result, a combination thereof, and other information used for determining scores of ownership factors as discussed below. The information determined may vary by ownership factor, e.g., some ownership factors may be analyzed with respect to a type while others are analyzed with respect to an amount. The specific information determined for each ownership factor may depend on the use case.

In an embodiment, the ownership factors include one or more of a type of action, recency or timing, an amount or frequency of interactions (i.e., a total amount or amount in a given time period), explicit indicators of owners, combinations thereof, portions thereof, and the like.

At S360, one or more ownership scores are generated for each identity. Each ownership score may represent, for example, a likelihood that a respective computing entity (e.g., a user or system) is the owner of a given identity.

In an embodiment, the ownership scores are realized as aggregate scores based on aggregating individual scores representing respective ownership factors. To this end, the ownership factors analyzed at S350 may be assigned respective scores representing how likely each factor indicates that a given entity is an owner for the identity by applying ownership scoring rules. To this end, each ownership score may be, for example but not limited to, a sum or average of respective scores for each factor. In a further embodiment, the ownership scores are generating using weighted scoring, with different factors being assigned different predetermined weights.

Various non-limiting examples of ownership scoring rules are now discussed with respect to respective ownership factors.

With respect to a type of action factor, the ownership scoring rules may define certain types of actions as being more likely to be performed by an owner than other actions, and the rules may define a predetermined score for each type of action representing a likelihood that the respective type of action would be performed by an identity owner. As a non-limiting example, changing a password may be assigned a score of 0.8 (on a scale from 0 to 1) to represent that an identity management action which is a password change is more likely to be indicative of ownership of the identity, i.e., the entity who performed that action on an identity is more likely to be an owner of that identity.

With respect to a recency or timing factor, the ownership scoring rules may define that an interaction which occurred more recently is assigned a higher score than an interaction which occurred less recently. To this end, the ownership scoring rules may define a calculation to be used for determining the score for this factor as a function of, for example, an amount of time since the interaction (i.e., an amount of time between the interaction and a current time).

With respect to an amount or frequency of interactions factor, the ownership scoring rules may define that an interaction which occurred more often (e.g., in total or in a given time period) is assigned a higher score than an interaction which occurred less often. To this end, the ownership scoring rules may define a calculation to be used for determining the score for this factor as a function of, for example, a number of interactions with the identity by a given entity represented in the interactions data.

With respect to an explicit indication of ownership factor, the ownership scoring rules may define entities who are explicitly indicated as being the owner for a given identity as having a higher score than entities who are not explicitly indicated as being the owner for that identity. To this end, the ownership scoring rules may define predetermined scores for entities explicitly indicated as owners and entities which lack explicit ownership indications, respectively (e.g., a score of 0.1 for an entity which lacks explicit ownership and a score of 0.9 for an entity which is explicitly indicated as an owner of the identity).

In this regard, it is noted that explicit indications of ownership tend to increase the likelihood that an entity owns an identity, but may not always be reliable. As a non-limiting example, when ownership changes, data indicating that an entity owns a given identity may remain after the change. Using explicit ownership indications as only one factor among multiple may allow for avoiding false positive ownership determinations.

At S370, suggested owners are determined for the identities based on the ownership scores. In an embodiment, computing entities who have ownership scores for a given identity above a predetermined threshold may be determined as owners for that identity. As noted above, in some embodiments, at least some of the suggested owners may be determined based on previously determined owners (e.g., owners of identities that accessed similar services or resources as discussed above with respect to S340).

In an embodiment, the suggested owners may be included in a list of potential owners to be provided (e.g., via a notification) and utilized (e.g., by an administrator acting with respect to accounts used by certain owners) as described herein. Such a list may include, but are not limited to, users who are not known to the system performing ownership determination, users who are known and logged in to the system performing ownership determination, other users (e.g., users who are known but not logged in to the system performing ownership determination), and the like.

It should be noted that FIG. 3 depicts a single iteration of identity ownership determination for simplicity, but that multiple iterations may be performed without departing from the scope of the disclosed embodiments.

Figure 4:
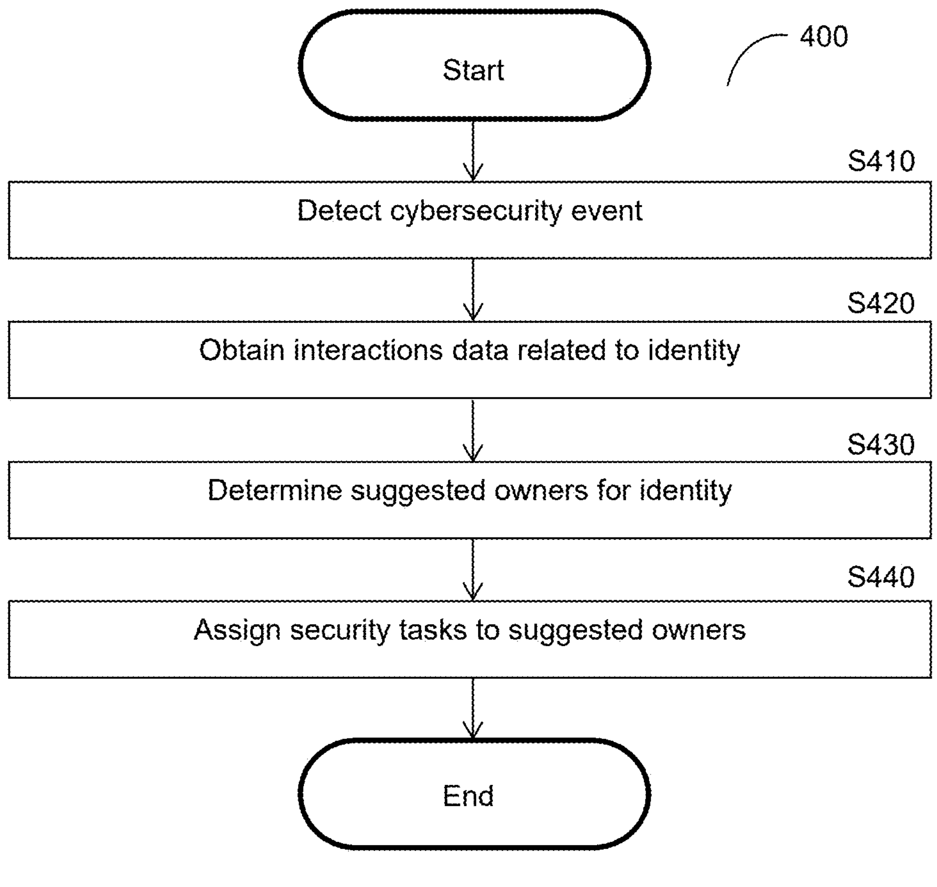
FIG. 4 is a flowchart illustrating a method for cybersecurity threat mitigation using ownership determination according to an embodiment.

FIG. 4 is a flowchart 400 illustrating a method for cybersecurity threat mitigation using ownership determination according to an embodiment. In an embodiment, the method is performed by the ownership manager 130, FIG. 1.

At S410, a cybersecurity event is detected. The cybersecurity event is related to an identity. As a non-limiting example, the cybersecurity event may be a policy violation caused by accessing a particular resource or performing a certain action using an identity in a manner that violates one or more security policies. As a result, remediating the cybersecurity event may include investigating activities involving that identity, and an owner of the identity would be a suitable candidate for such investigation.

At S420, interactions data is obtained for the identity related to the cybersecurity event. More specifically, the obtained interactions data includes data indicating interactions with or using the identity. In an embodiment, the interactions data includes identity management actions and, more specifically, identity management actions performed in order to control access activities of the identity related to the cybersecurity event. The obtained interactions data may be or may include log or audit data indicating various interactions related to identities within a computing environment.

At S430, suggested owners are determined for the identity based on the obtained interactions data. The suggested owners may be determined by aggregating interactions, for example as described further above with respect to FIG. 3.

At S440, one or more cybersecurity tasks are assigned to the suggested owners for the identity related to the cybersecurity event. As noted above, by accurately identifying owners of computing identities, the entities which are most likely to be both able and willing to perform any necessary remediation actions can be identified. This improves security of the computing environment by both increasing the likelihood that appropriate remediation actions are performed and by reducing the average time for performing remediation actions (e.g., by avoiding situations where the wrong entity is assigned remediation tasks and those tasks are either left incomplete or need to be reassigned before being executed). In some embodiments, assigning the cybersecurity tasks includes assigning a policy violation or other cybersecurity event involving the identity to the suggested owners for the identity.

Figure 5:
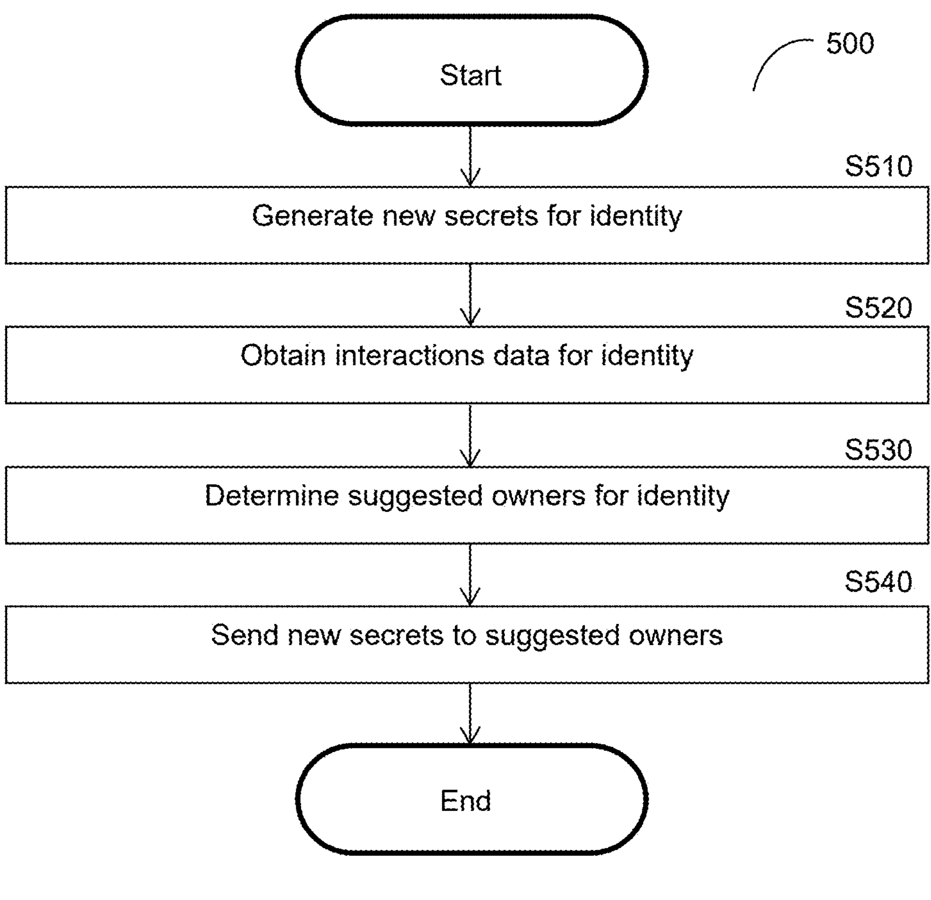
FIG. 5 is a flowchart illustrating a method for secrets rotation using ownership determination according to an embodiment.

FIG. 5 is a flowchart 500 illustrating a method for secrets rotation using ownership determination according to an embodiment. In an embodiment, the method is performed by the ownership manager 130, FIG. 1.

At S510, one or more new secrets are generated for an identity. Specifically, the identity is an identity which was selected for secrets rotation, i.e., rotating in new secrets and rotating out old secrets such that the new secrets are used by that identity going forward after a certain point and the old or otherwise existing secrets cease being used after a certain point.

The secrets rotation may be performed periodically, upon detection of one or more misconfigurations, after certain cybersecurity events, and the like. Accordingly, the identity may be selected for secrets rotation based on meeting one or more of these criteria.

At S520, interactions data is obtained for the identity whose secrets are to be rotated. More specifically, the obtained interactions data includes data indicating interactions with or using the identity. In an embodiment, the interactions data includes identity management actions and, more specifically, identity management actions performed in order to control access activities of the identity related to the cybersecurity event. The obtained interactions data may be or may include log or audit data indicating various interactions related to identities within a computing environment.

At S530, suggested owners are determined for the identity based on the obtained interactions data. The suggested owners may be determined by aggregating interactions, for example as described further above with respect to FIG. 3.

At S540, the new secrets for sent to the suggested owners for the identity. The sent new secrets may be switched with old or otherwise existing secrets used by or for the identity such that the new secrets are to be used for at least some activities involving the identity going forward.

In an embodiment, S540 further includes completing rotation of secrets for the identity by disabling old secrets. In a further embodiment, such secrets rotation may further include verifying that the old secrets have ceased being used, that the new secrets have begun being used, or both, and disabling the old secrets once such circumstances have been verified.

In yet a further embodiment, a contextually enriched machine identity may be created for the identity (e.g., a contextually enriched version of the identity whose secrets are to be rotated) by graphing connections between consumers of resources and resources which are consumed based on data obtained from multiple integrated data sources in order to allow for uniquely identifying instances of the identity represented in different data sources, thereby allowing for more accurately verifying that secrets have ceased or begun being used.

An example process for secrets rotation involving verifying cessation of use of secrets and disabling secrets using contextual machine identities which may be utilized in accordance with at least some disclosed embodiments is described further in U.S. patent application Ser. No. 18/412,870, assigned to the common assignee, the contents of which are hereby incorporated by reference.

Figure 6:
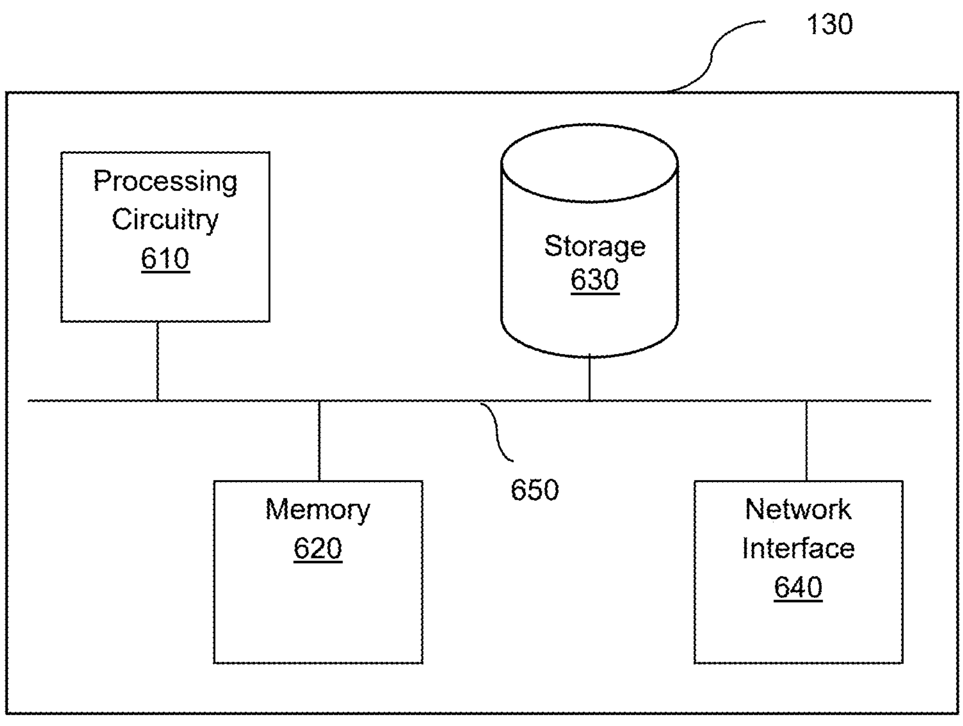
FIG. 6 is a schematic diagram of an ownership manager according to an embodiment.

FIG. 6 is an example schematic diagram of an ownership manager 130 according to an embodiment. The ownership manager 130 includes a processing circuitry 610 coupled to a memory 620, a storage 630, and a network interface 640. In an embodiment, the components of the ownership manager 130 may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 620 may be volatile (e.g., random access memory, etc.), non-volatile (e.g., read only memory, flash memory, etc.), or a combination thereof.

In one configuration, software for implementing one or more embodiments disclosed herein may be stored in the storage 630. In another configuration, the memory 620 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein.

The storage 630 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 640 allows the ownership manager 130 to communicate with other systems, devices, components, applications, or other hardware or software components, for example as described herein.

It should be understood that the embodiments described herein are not limited to the specific architecture illustrated in FIG. 6, and other architectures may be equally used without departing from the scope of the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein can be implemented as hardware, firmware, software, or any combination thereof. Moreover, the software may be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for identity ownership determination, comprising:

identifying a plurality of interactions performed with respect to a plurality of computing identities, wherein each interaction is performed by a respective entity of a plurality of entities and with respect to a respective computing identity of the plurality of computing identities;

aggregating the plurality of interactions in order to create at least one set of aggregated interactions, wherein each set of aggregated interactions includes a subset of the plurality of interactions performed with respect to one of the plurality of computing identities, wherein the plurality of interactions includes a plurality of modifications of data used to manage access activities of the plurality of computing identities;

determining an owner of each computing identity based on the at least one set of aggregated interactions, wherein the owner of each computing identity is one of the plurality of entities;

generating a new secret for the computing identity;

sending a notification indicating the new secret to the determined owner;

verifying cessation of use of an old secret by the computing identity;

verifying use of the new secret by the computing identity; and disabling the old secret when the cessation of use of the old secret and the use of the new secret have been verified.

2. The method of claim 1, further comprising:

analyzing a plurality of uses of permissions with respect to the computing identity; and determining a plurality of identity management actions among the plurality of interactions based on the plurality of uses of permissions with respect to the computing identity, wherein each of the plurality of identity management actions includes one of the plurality of modifications of data, wherein the owner of the computing identity is determined based further on the plurality of identity management actions.

3. The method of claim 2, wherein the plurality of identity management actions include at least one of: changing a password, assigning a role, and assigning permissions.

4. The method of claim 1, further comprising:

generating a plurality of ownership scores for the computing identity, wherein the owner of the computing identity is determined based further on the plurality of ownership scores.

5. The method of claim 4, wherein the plurality of ownership scores is determined based on at least one: a type of each interaction, a recency of each interaction, an amount of interactions, and an explicit indication of ownership for the computing identity.

6. The method of claim 1, wherein the computing identity is a first computing identity, further comprising:

analyzing at least one historical ownership result for a second computing identity, wherein the owner of the first computing identity is determined based on an owner of the second computing identity among the at least one historical ownership result, wherein the owner of the first computing identity is determined based further on a service or resource accessed using the first computing identity and a service or resource accessed using the second computing identity.

7. The method of claim 1, further comprising:

assigning at least one remediation task to the determined owner, wherein the at least one remediation task is to remediate a cybersecurity event involving the computing identity.

8. A non-transitory computer readable medium having stored thereon instructions for causing a processing circuitry to execute a process, the process comprising:

identifying a plurality of interactions performed with respect to a plurality of computing identities, wherein each interaction is performed by a respective entity of a plurality of entities and with respect to a respective computing identity of the plurality of computing identities;

aggregating the plurality of interactions in order to create at least one set of aggregated interactions, wherein each set of aggregated interactions includes a subset of the plurality of interactions performed with respect to one of the plurality of computing identities, wherein the plurality of interactions includes a plurality of modifications of data used to manage access activities of the plurality of computing identities;

determining an owner of each computing identity based on the at least one set of aggregated interactions, wherein the owner of each computing identity is one of the plurality of entities;

generating a new secret for the computing identity;

sending a notification indicating the new secret to the determined owner;

verifying cessation of use of an old secret by the computing identity;

verifying use of the new secret by the computing identity; and disabling the old secret when the cessation of use of the old secret and the use of the new secret have been verified.

9. A system for identity ownership determination, comprising:

a processing circuitry; and a memory, the memory containing instructions that, when executed by the processing circuitry, configure the system to:

identify a plurality of interactions performed with respect to a plurality of computing identities, wherein each interaction is performed by a respective entity of a plurality of entities and with respect to a respective computing identity of the plurality of computing identities;

aggregate the plurality of interactions in order to create at least one set of aggregated interactions, wherein each set of aggregated interactions includes a subset of the plurality of interactions performed with respect to one of the plurality of computing identities, wherein the plurality of interactions includes a plurality of modifications of data used to manage access activities of the plurality of computing identities;

determine an owner of each computing identity based on the at least one set of aggregated interactions, wherein the owner of each computing identity is one of the plurality of entities;

generate a new secret for the computing identity;

send a notification indicating the new secret to the determined owner;

verify cessation of use of an old secret by the computing identity;

verify use of the new secret by the computing identity; and disabling the old secret when the cessation of use of the old secret and the use of the new secret have been verified.

10. The system of claim 9, wherein the system is further configured to:

analyze a plurality of uses of permissions with respect to the computing identity; and determine a plurality of identity management actions among the plurality of interactions based on the plurality of uses of permissions with respect to the computing identity, wherein each of the plurality of identity management actions includes one of the plurality of modifications of data, wherein the owner of the computing identity is determined based further on the plurality of identity management actions.

11. The system of claim 10, wherein the plurality of identity management actions include at least one of: changing a password, assigning a role, and assigning permissions.

12. The system of claim 9, wherein the system is further configured to:

generate a plurality of ownership scores for the computing identity, wherein the owner of the computing identity is determined based further on the plurality of ownership scores.

13. The system of claim 12, wherein the plurality of ownership scores is determined based on at least one: a type of each interaction, a recency of each interaction, an amount of interactions, and an explicit indication of ownership for the computing identity.

14. The system of claim 9, wherein the computing identity is a first computing identity, wherein the system is further configured to:

analyze at least one historical ownership result for a second computing identity, wherein the owner of the first computing identity is determined based on an owner of the second computing identity among the at least one historical ownership result, wherein the owner of the first computing identity is determined based further on a service or resource accessed using the first computing identity and a service or resource accessed using the second computing identity.

15. The system of claim 9, wherein the system is further configured to:

assign at least one remediation task to the determined owner, wherein the at least one remediation task is to remediate a cybersecurity event involving the computing identity.

* * * * *